April 8, 1958     E. W. NILSSON     2,829,713
FLYING SHEAR AND DRIVE MECHANISM THEREFOR
Filed Nov. 5, 1953     8 Sheets-Sheet 1
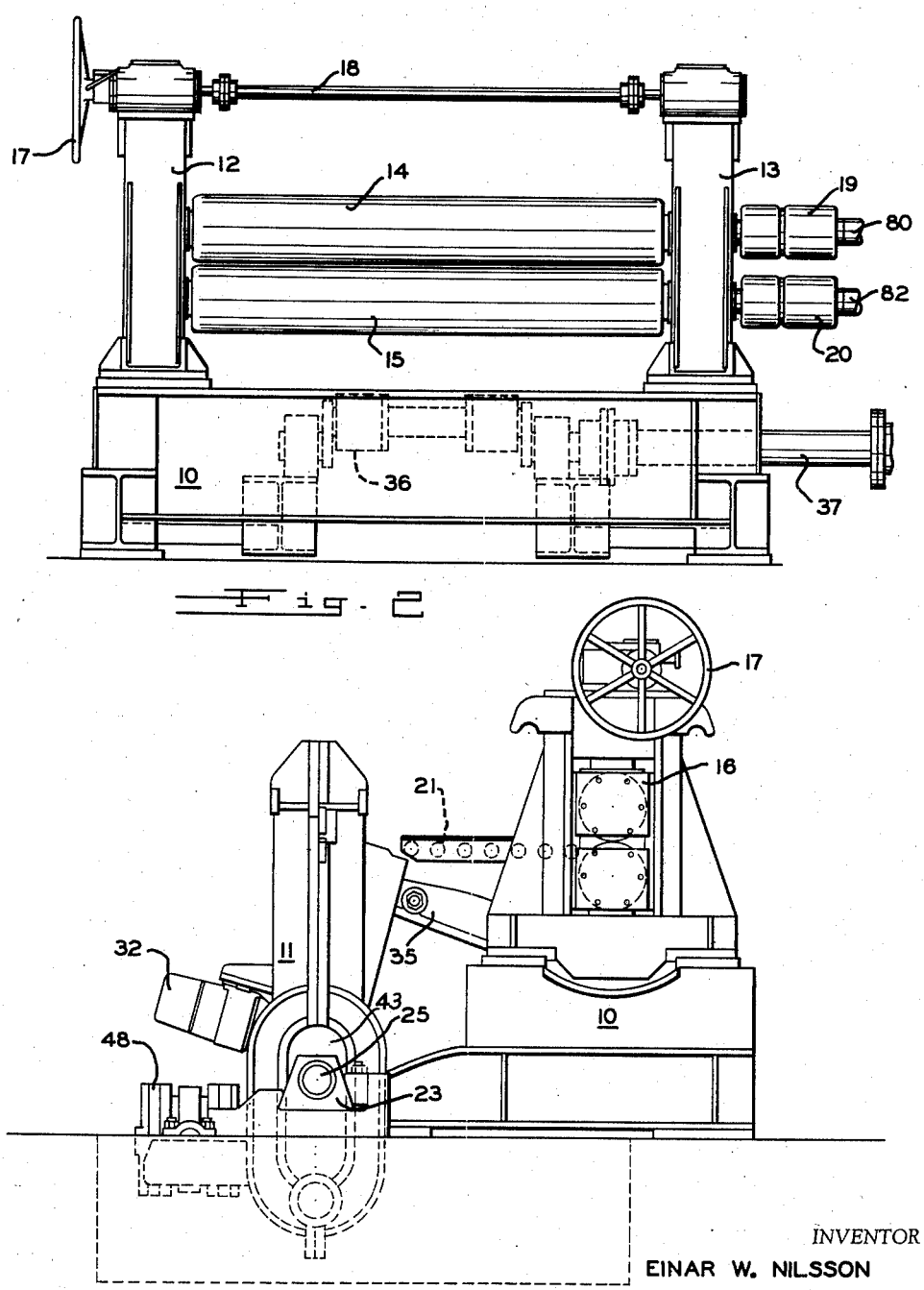
INVENTOR
EINAR W. NILSSON
BY Francis J. Klempay
ATTORNEY April 8, 1958 E. W. NILSSON 2,829,713
FLYING SHEAR AND DRIVE MECHANISM THEREFOR
Filed Nov. 5, 1953 8 Sheets-Sheet 2
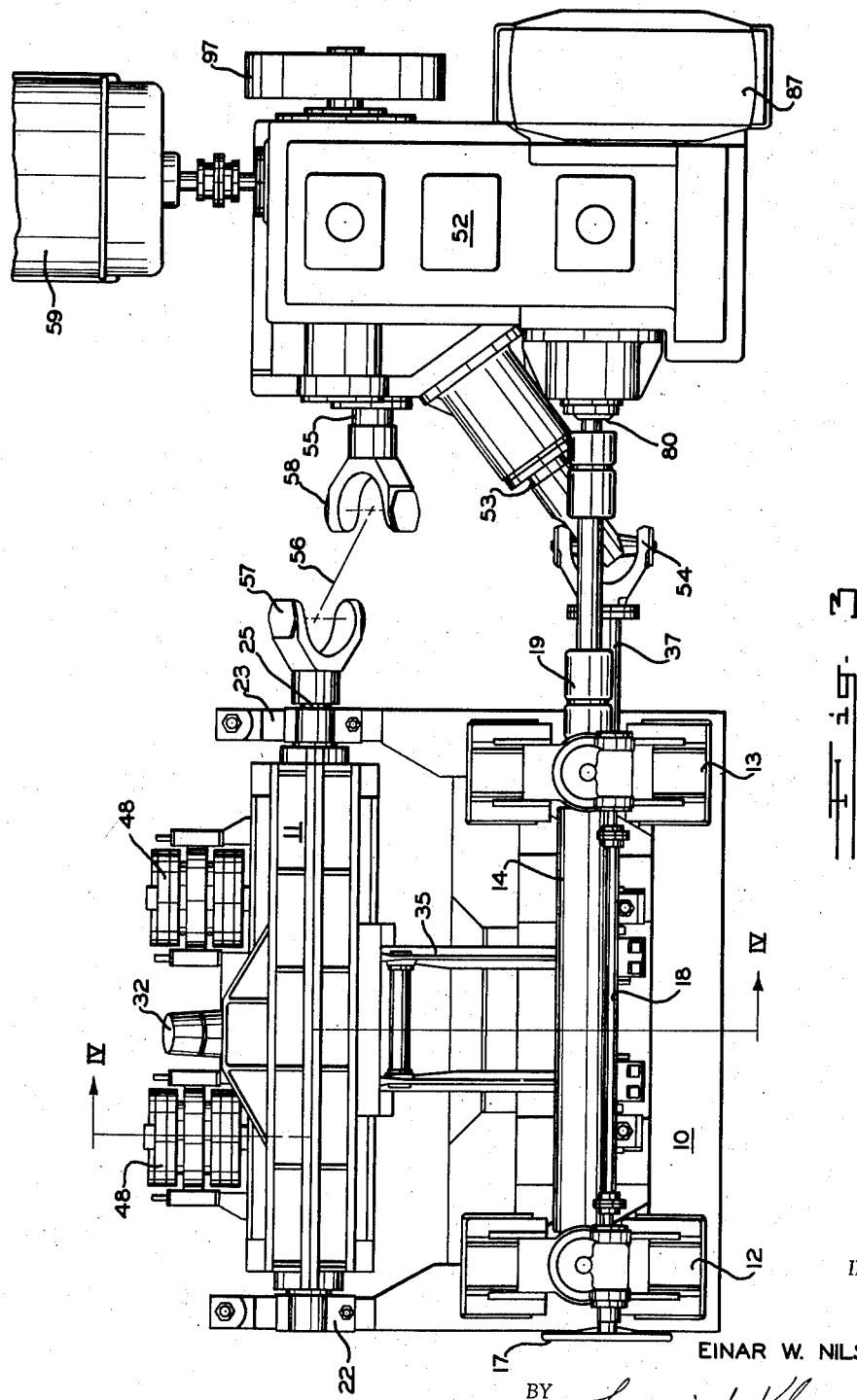
INVENTOR
EINAR W. NILSSON
BY
ATTORNEY April 8, 1958  E. W. NILSSON  2,829,713
FLYING SHEAR AND DRIVE MECHANISM THEREFOR
Filed Nov. 5, 1953  8 Sheets-Sheet 3
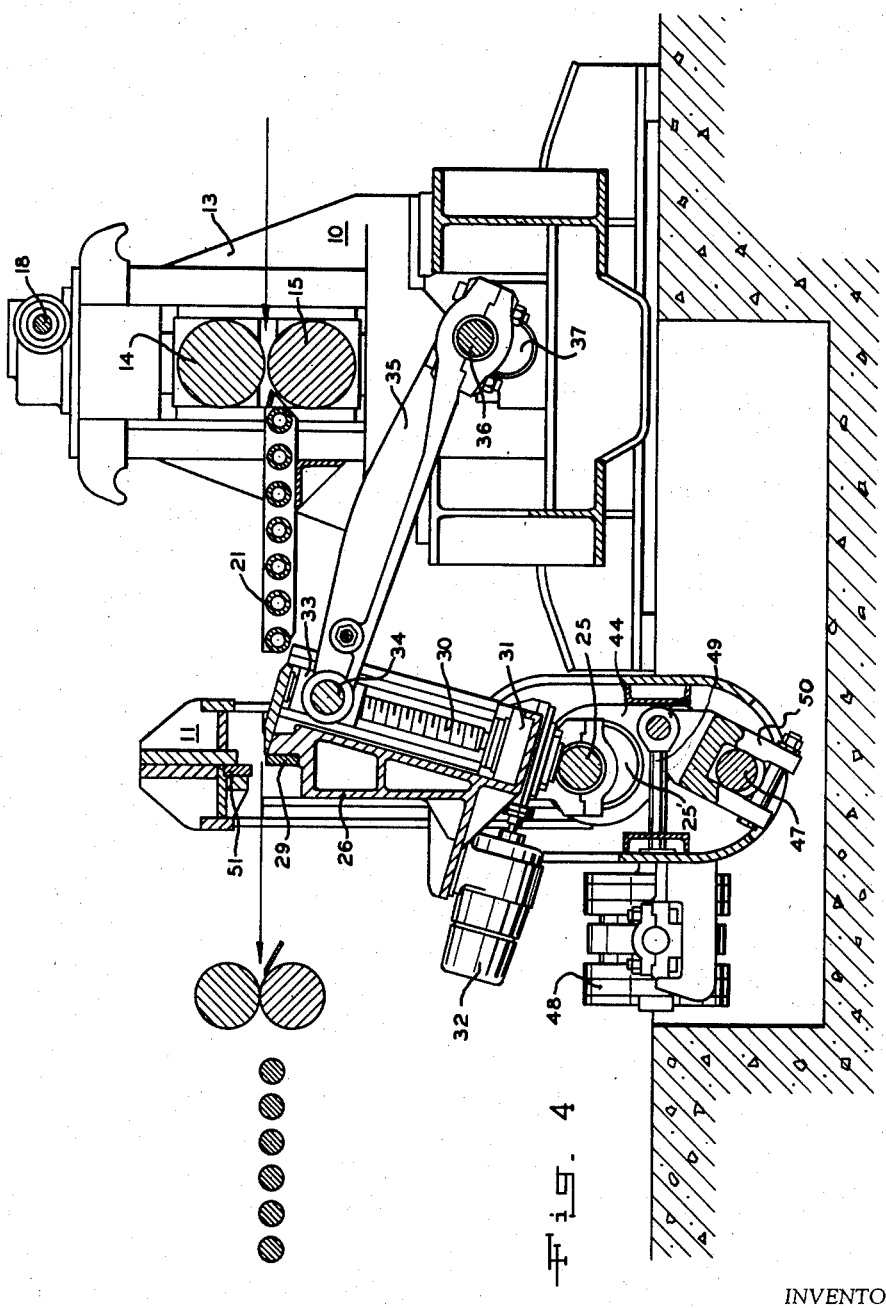
INVENTOR
EINAR W. NILSSON
BY *Francis J. Klempay*
ATTORNEY April 8, 1958 E. W. NILSSON 2,829,713
FLYING SHEAR AND DRIVE MECHANISM THEREFOR
Filed Nov. 5, 1953 8 Sheets-Sheet 4
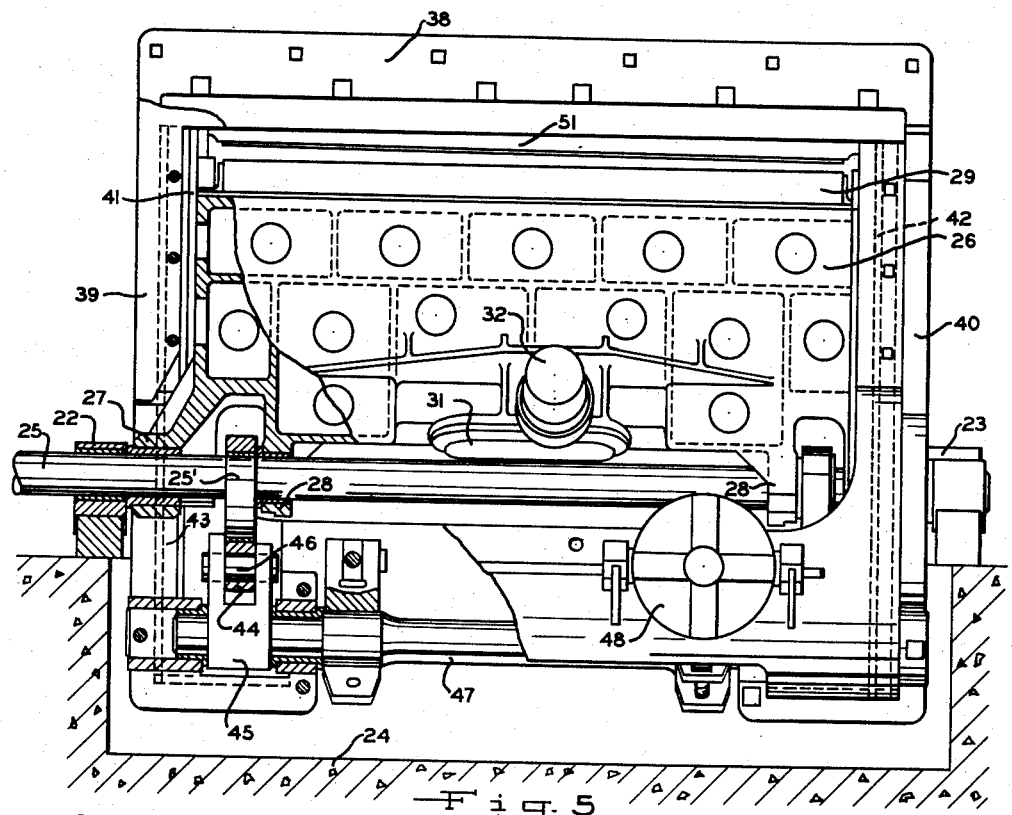
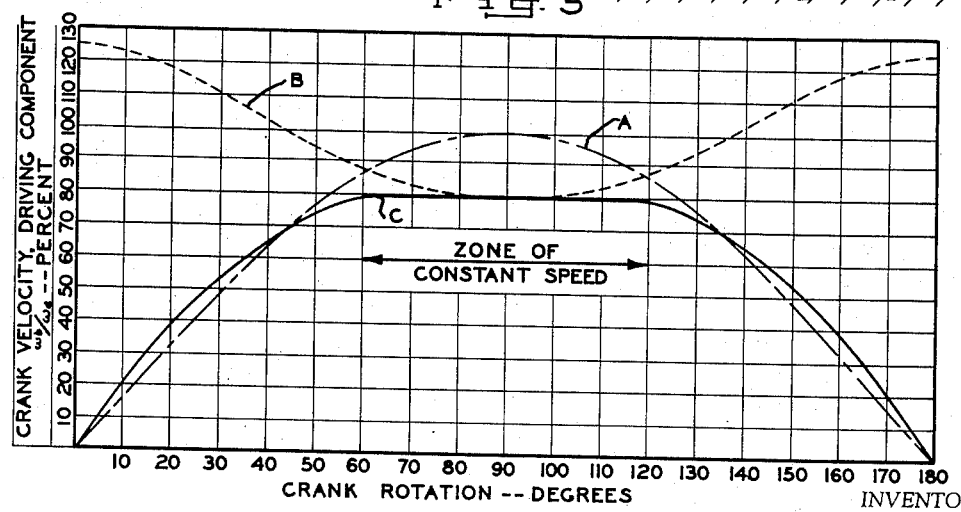
INVENTOR
EINAR W. NILSSON
BY *Francis J. Klempay*
ATTORNEY

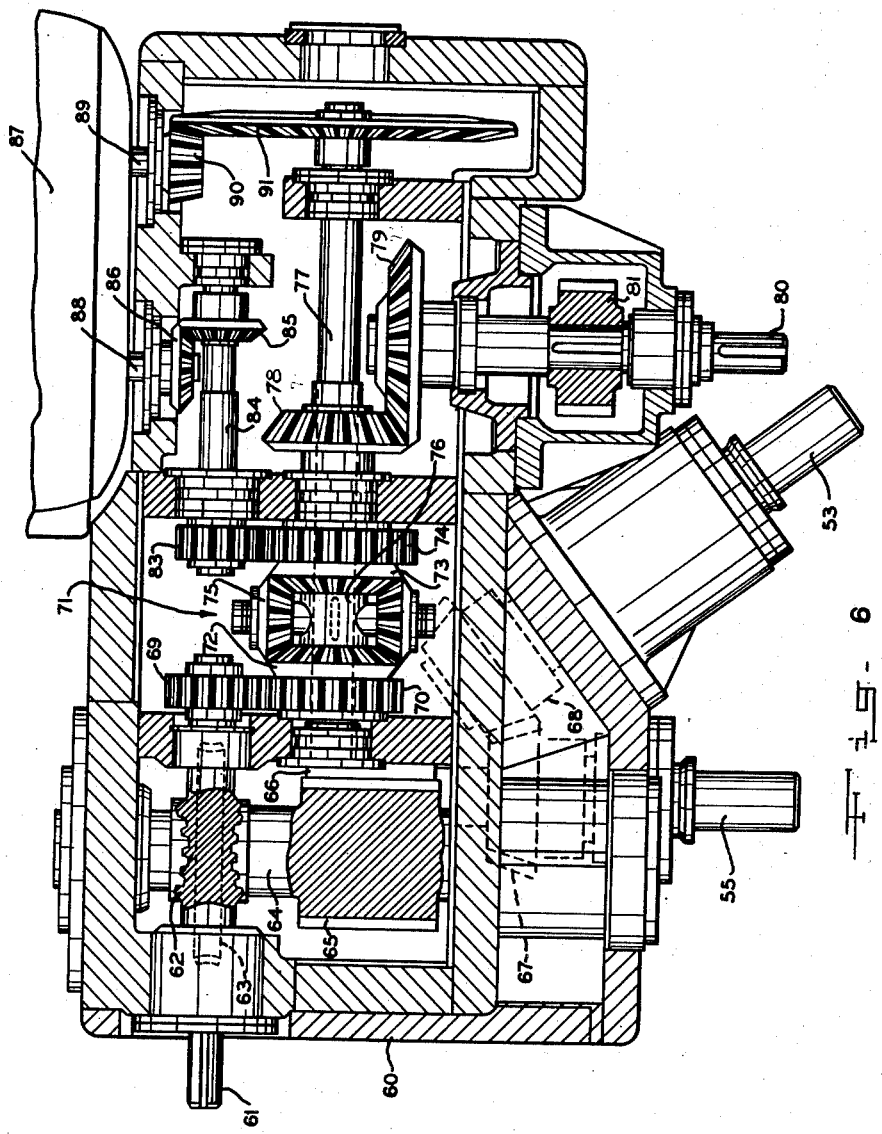

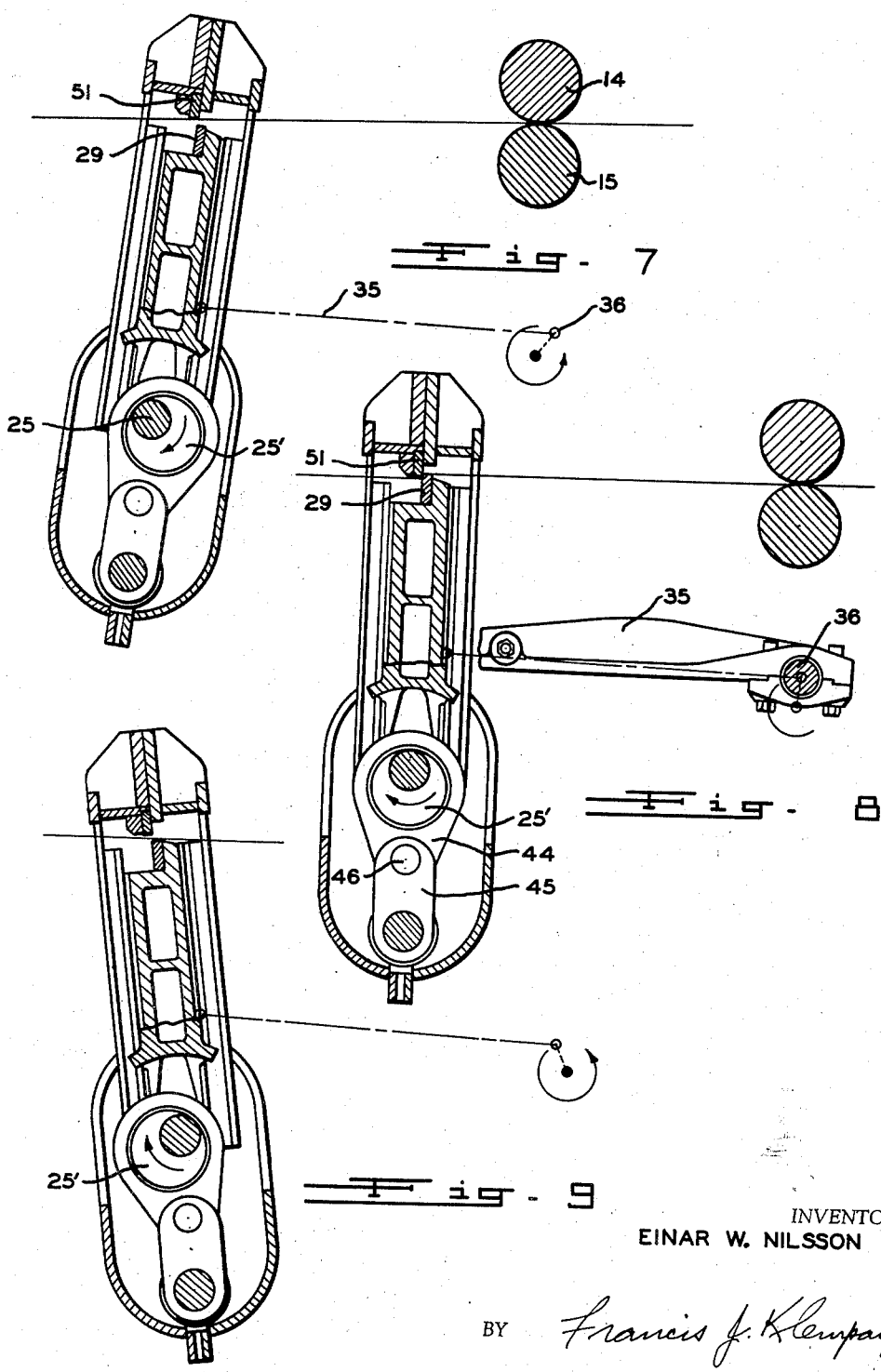

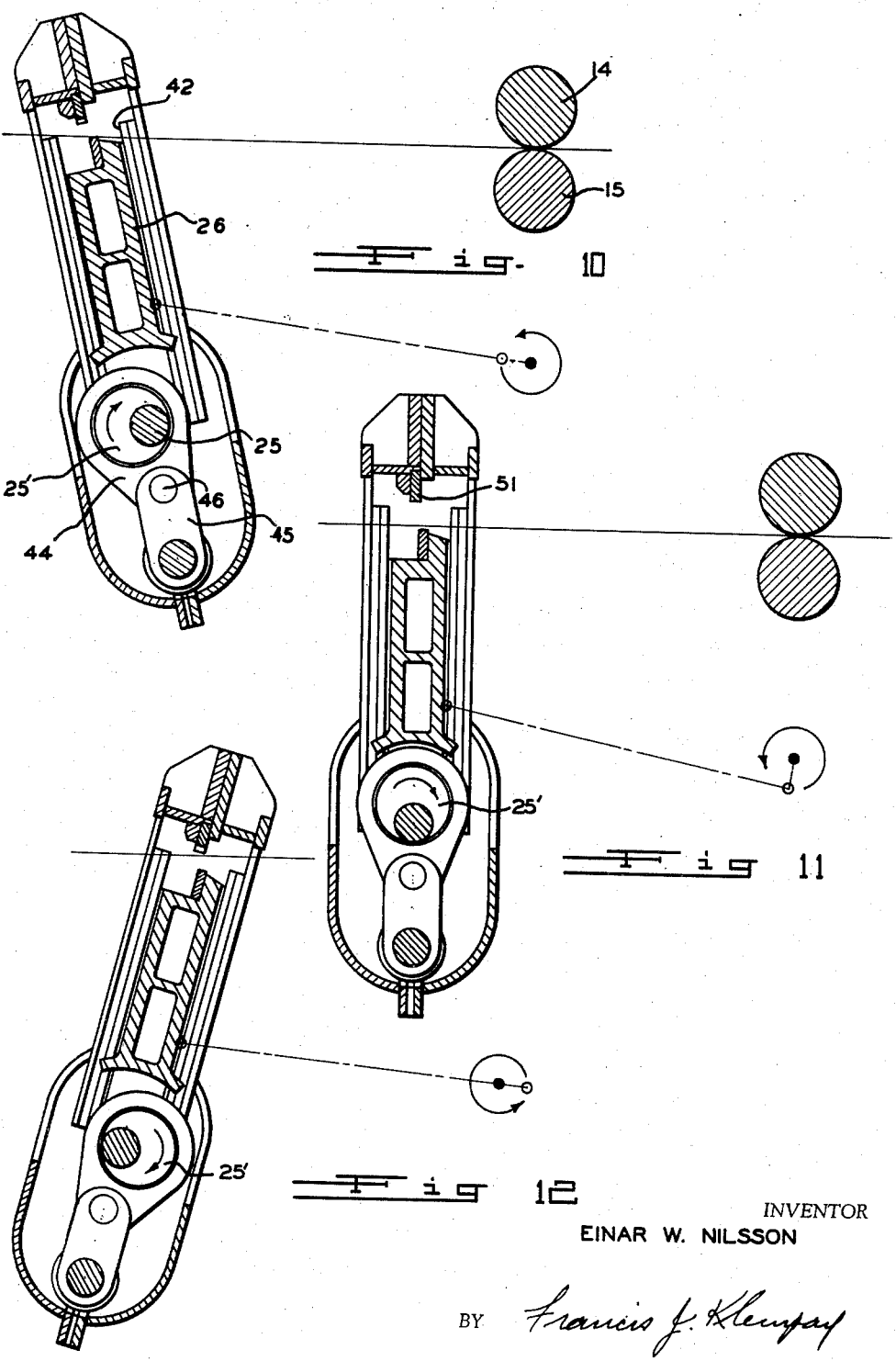

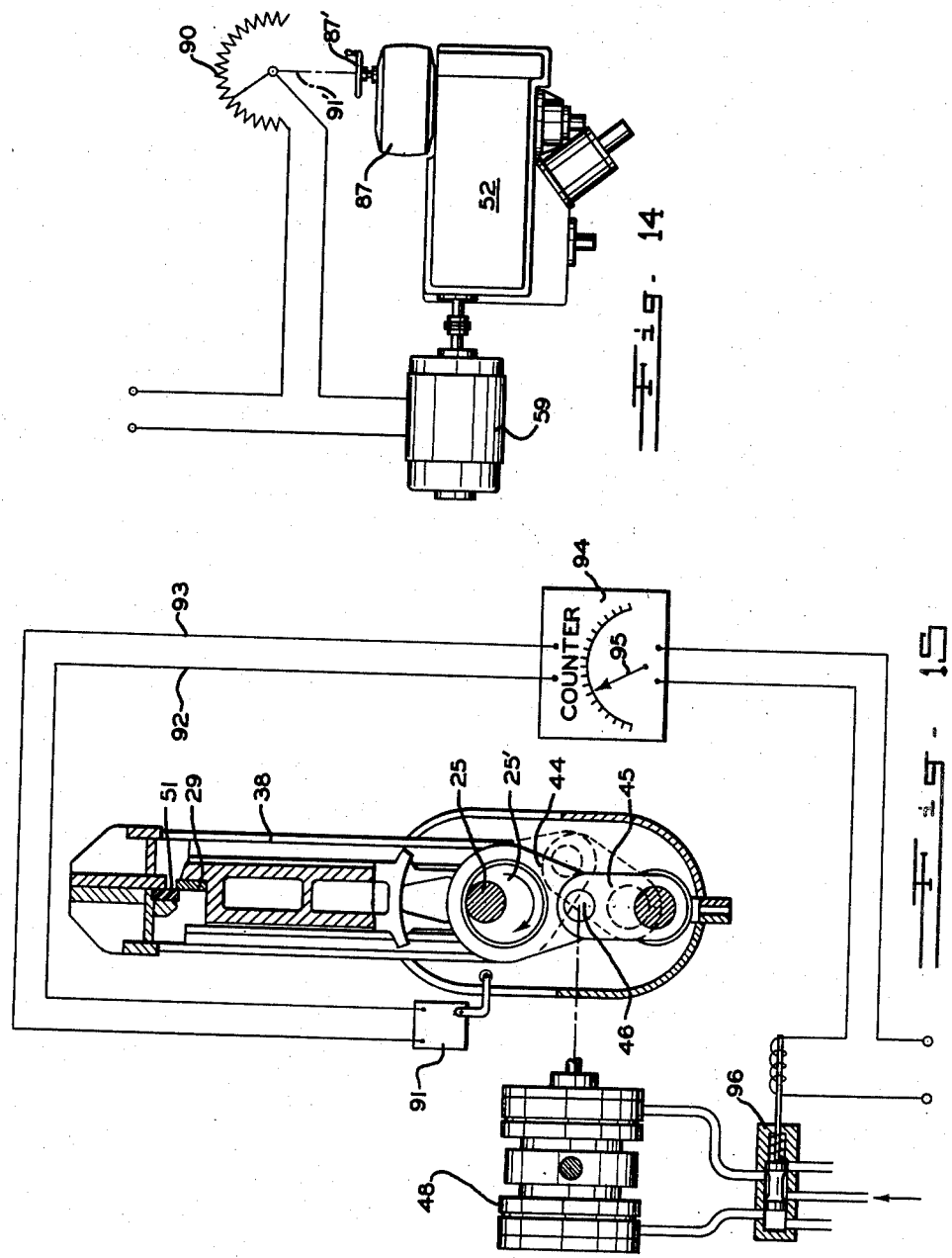

United States Patent Office 2,829,713
Patented Apr. 8, 1958

2,829,713

FLYING SHEAR AND DRIVE MECHANISM THEREFOR

Einar W. Nilsson, Youngstown, Ohio

Application November 5, 1953, Serial No. 390,288

13 Claims. (Cl. 164—49)

The present invention relates to shearing apparatus, and more particularly to improvements in devices employed for shearing predetermined lengths from continuously moving material.

As its overall object, the present invention seeks to provide a novel and substantially improved apparatus for incorporation into a line of continuously moving material whereby such material may be periodically severed or sheared into desired lengths.

As perhaps its most important single object the invention contemplates the provision of a flying shear device, for severing continuously moving material, such as metal sheet and strip, for example, which is characterized by the provision of improved means for synchronizing the movement of the flying shear device with that of the stock for a substantial period of time so that the severing operation may be carried out more advantageously than was heretofore possible under the conditions contemplated. It is common practice, of course, in the shearing of continuously moving material, to synchronize the speed of the cutting device as closely as possible with that of the moving material so that the cutting operation may take place without substantial relative longitudinal movement between the cutting device and the material being cut. But it is further true that prior to the present invention it has not been possible, without extremely complicated and costly mechanisms, to synchronize the cutting device and material for longer than a relatively short instant. Thus, it has heretofore been necessary to effect a complete severing operation in a very short time, resulting in the application of high shock loads and forces to the cutting apparatus, and thereby complicating the construction and maintenance of such apparatus.

More specifically, it is an object of the present invention to provide a flying shear device of the rocking frame type which is provided with novel and improved means for rocking or moving the frame so as to carry the shearing mechanism in substantially exact synchronism with the moving stock for a substantial portion of the rocking cycle of the frame to thereby provide for a substantial period of time wherein the material may be severed in an accurate and even manner, without heavy shock forces and without equipment of a particularly heavy or rugged nature.

In the construction of flying shears of the rocking frame type it has been heretofore suggested to incorporate a rotating crank or equivalent mechanism for rocking the shear frame about its pivotal axis, the shearing operation taking place during that portion of the crank cycle wherein the frame is driven at a nearly uniform speed. Of course, in such prior arrangements the shear frame movement attains only a rough approximation of uniformity, and this for only a very small portion of a complete cycle or revolution of the crank. However, by my present invention I propose to utilize and improve this same general arrangement by incorporating thereinto an improved arrangement for modifying the cycle of movement of the driving crank whereby the movement of the shear frame may be rendered substantially exactly uniform and synchronized with the moving material over a substantial portion of the crank cycle.

Another object of my invention is the provision of an improved and substantially simplified flying shear apparatus wherein are incorporated improved means for regulating the length of the sections of material severed. In this respect the invention contemplates an improved arrangement for varying the number of shearing cycles per unit of linear movement of the continuously moving stock, and, additionally, an improved arrangement for selectively rendering the shearing apparatus effective or ineffective during certain shearing cycles so that sheared sections of material may be determined in terms of selected multiples of the shear cycle.

In connection with the above object, the present invention contemplates an improved arrangement for effecting "miss-cut" in selected shearing cycles. That is, while the shearing cycle is carried out in substantially all respects, the shearing blades are caused to move in non-shearing relation whereby no actual severing operation takes place. And, as an improvement over apparatus heretofore suggested for this purpose, my invention teaches a novel toggle arrangement, which may be operated by suitable air cylinder devices, for example, whereby in response to an appropriate control stimulus the apparatus may be easily and quickly conditioned for cutting or for miss-cutting, as may be desired. Further, in this regard, the invention discloses a novel control arrangement whereby the shearing apparatus may be caused to cut and miss-cut in a definite cyclic relation in response to electrical or other pilot-type control stimuli having remote association with the shearing apparatus proper.

Yet another and important object of the invention is the provision of an improved driving mechanism which is particularly adapted for the operation of the shearing apparatus of the type disclosed, whereby the shearing cycle of the apparatus may be readily varied in relation to the rate at which material continuously moves through the shearing apparatus.

Thus, in order to alter the length of material to be severed it may be necessary to either increase or decrease the number of shearing cycles per unit of material travel. Heretofore it has been suggested for such purpose to employ a differential drive mechanism, monitored by means of a variable speed mechanism having positive drive characteristics, whereby a rugged high power drive is afforded which is infinitely variable within predetermined design limits. The differential mechanism in this type of drive arrangement is employed to overcome the inherent inability of positive drive variable speed devices of reasonable physical size to deliver high power output. In the present invention there are employed, in combination, a differential and positive-infinitely-variable, or "P. I. V." drive, these mechanisms, however, being arranged in an improved relation whereby more efficient and more desirable power transmission is obtained. Particularly, the present invention provides a novel power transmission device of the above described type wherein the variable drive or "P. I. V." unit is arranged to be operated at a constant input speed notwithstanding intentional wide variations in the speed of the driving motor.

To fully comprehend the above object it must be understood that shear apparatus of the type herein contemplated includes not only a shearing device but feeding rolls or mechanism for feeding the material to the shearing device, the feeding and shearing devices being maintained in predetermined correlation by means of a drive mechanism of the above type whereby one of the devices may be varied in relation to the other. Now, inasmuch as there are necessarily certain shock forces in connection with the operation of the shear device proper it has been determined to be more desirable to drive the shearing blades or device through a direct gear drive from the main power source and independently of the more delicate P. I. V. mechanism, the latter being employed in the material feeding system which is substantially free of shock loads. Thus, to reduce or increase the number of shearing cycles per unit of time it is necessary to slow down or speed up the main drive motor, as the case may be. In turn, it is then necessary to speed up or slow down the feed rolls in relation to the drive motor so that a constant line speed may be maintained. And in the present invention I accomplish all this while maintaining a constant input speed on the P. I. V. unit, as will presently be explained in greater detail.

Another object of the invention is the provision of a flying shear of the rocking frame type, having separate drive connections for rocking the frame and actuating the shearing devices, which is characterized by the provision of an improved driving arrangement for driving the shearing devices and frame in equal cyclic periods while providing non-uniformity in the instantaneous movement of both so that the movement of the frame is decelerated from its normal cyclic movement during a severing operation while the cutting or shearing devices are accelerated during this same period. And, as will become increasingly apparent, the invention accomplishes this without unusual and complicated mechanisms, as has been heretofore required.

The above and other objects and advantages of the invention will become apparent upon full consideration of the following detailed specification and accompanying drawings wherein is shown a preferred embodiment of my invention.

In the drawing:

Figure 1 is a side elevation of a flying shear device constructed in accordance with the teachings of my invention;

Figure 2 is an end elevation of the flying shear apparatus of Figure 1, showing, in particular, the feed rolls and related mechanism;

Figure 3 is a top plan view of the complete flying shear system of my invention, including the drive mechanism therefor;

Figure 4 is a longitudinal section view of my apparatus, taken generally along line IV—IV of Figure 3;

Figure 5 is an end elevation, partly in section of the shearing device forming a part of the apparatus of Figure 1;

Figure 6 is a section view of the drive mechanism which forms a part of the present invention, illustrating details of the construction and operation of the drive;

Figures 7–9 are sequential views of the flying shear device of my invention during various stages of a severing operation;

Figures 10–12 are sequential views of the flying shear device of my invention during return movement of the shear following a shearing operation.

Figure 13 is an illustrative graph indicating the resultant velocity of the shearing blades of my improved shear device over approximately one half of a complete shearing cycle; and Figures 14 and 15 are simplified schematic representations of preferred control circuit arrangements employed in connection with my shear apparatus.

Referring now to the drawings, and initially to Figures 1–4 thereof, the reference numeral 10 designates generally the material feeding apparatus, and the numeral 11 the shearing apparatus of my invention. In accordance with usual practice, the material feeding and shearing assemblies 10 and 11 are cooperating elements of the overall flying shear apparatus combination, the arrangement being such that the rate of feeding of material, or line speed, at all times bears a direct relation to the period of the shear cycle.

In the illustrated embodiment of the invention the feeding apparatus 10 comprises a pair of spaced upright stanchions 12 and 13 in which are journaled a pair of horizontally disposed pinch rolls or feed rolls 14 and 15. In accordance with usual construction the upper feed roll 14 is mounted in vertically movable journal blocks, as at 16, and provided with suitable adjusting means 17 and 18 for raising and lowering the roll 14 in relation to the lower roll 15. The purpose of this is, of course, to provide for the accommodation in the feed rolls 14 and 15 of strip material of various thicknesses.

As indicated in Figures 2 and 3, the feed rolls 14 and 15 are provided at one end with driving connections 19 and 20 respectively, by means of which the feed rolls are associated with power means to be hereafter described in considerable detail.

At the exit or outgoing side of the feed rolls 14 and 15 there is provided a short run-out table comprising a plurality of rollers 21 for supporting strip material, not shown, between the feeding and shearing apparatus.

Positioned at the rear of the feeding apparatus 10, in the direction of material feed, are a pair of widely spaced journal blocks 22 and 23 which are rigidly secured to the machine base resting upon a suitable foundation 24, and which journal and support an elongated shaft 25. And, in accordance with the teachings of the invention, there is supported on the shaft 25 a carrier 26 which is preferably of relatively rugged welded construction. The carrier 26 is provided with a plurality of spaced journal portions 27 and 28 which engage the shaft 25 in such manner as to permit rotation of the shaft and independent pivotal movement of the carrier about the axis of the shaft. Securely mounted at the upper edge of the carrier 26 is a shear blade 29 the upper edge of which is positioned slightly below the pass line of material traveling through the feed rolls 14 and 15 and over the supporting rolls 21.

Forming an integral or assembled part of the carrier 26 is a journal assembly for rotatably supporting a pair of spaced threaded shafts, one of which is indicated at 30 in Figure 4. In the preferred embodiment of the invention the threaded shafts 30 are supported in forwardly inclined relation to the general plane of the carrier 26, as is further indicated in Figure 4. Engaging the lower ends of the shafts 30 is a reduction gear assembly, designated generally by the reference numeral 31, which is powered by means of a suitable electric motor 32 mounted rigidly on the carrier 26. And, as will hereafter be more fully explained, the motor 32 may be energized as desired to rotate the threaded shafts 30.

Engaging the shafts 30 are spaced internally threaded blocks 33 which support pivot pins or shafts 34. The shafts 34 pivotally engage a pair of spaced driving rods or links 35 which extend forwardly of the shear apparatus and are connected at their forward ends to the eccentric reach 36 of a crankshaft 37. And in the preferred and illustrated embodiment of the invention the crankshaft 37 is journaled in the base portion of the feed roll supporting assembly. The crankshaft 37 is journaled generally below the feed rolls 14 and 15, and is provided with a driving connection which extends outwardly of the right hand side of the stanchion 13, as indicated in Figure 2.

As will be understood, upon rotation of the crank 37 the carrier 26 will be caused to rock or pivot about the supporting shaft 25, the amplitude of the rocking motion being proportionate to the distance of the connecting shafts 34 from the supporting shaft 25 and hence capable of adjustment by rotation of the threaded shafts 30.

Positioned in surrounding relation to the carrier 26, and guided for generally vertical sliding movement in the plane of the carrier is a rectangular frame member 38. The frame 38 is provided along its upwardly extending side members 39 and 40 with guide channels 41 and 42 which engage the upright side edges of the carrier 26 so that relative movement between the carrier 26 and frame 38 may take place only in a generally vertical direction, and only in the plane of the carrier. In accordance with the teachings of the invention the side members 39 and 40 of the frame are provided with vertically elongated openings 43 near their lower end portions, through which openings the supporting shaft 25 may pass without engaging the frame.

Also in accordance with the teachings of the invention the supporting shaft 25 is provided with a pair of eccentric portions 25' upon which are journaled and supported spaced toggle assemblies, each comprised of pivotally connected links 44 and 45, which engage the lower ends of the side members 39 and 40 and support the entire frame 38. The links 44 and 45 are connected together by means of pivot pins 46. And when these links are locked in any position there is afforded a direct mechanical connection between the eccentric portions 25' of the supporting shaft 25 and frame 38, the arrangement being such that upon rotation of the shaft 25 the frame 38 is caused to move upward and downward, through a reciprocatory cycle determined by the eccentricity of the portions 25'. Any reciprocations of the frame 38 are, of course, relative to the carrier 26 and, for practical purposes, independent of any rocking movement of the carrier, the frame 38 being carried along with the carrier 26 during such rocking movement.

To connect the toggle assemblies 44—46 with the frame 38 in the manner desired I have provided a shaft 47 which is journaled at each side of the frame 38, in the lower end portions of the side members 39 and 40 thereof. Keyed or otherwise locked to the shaft 47, adjacent its ends, are the lower links 45 of the toggle assemblies 44—46. The arrangement is such that when the shaft 47 is locked against rotation with respect to the frame 38 the toggle links 45 become, in effect, integral parts of the frame. Then, upon rotation of the shaft 25, the entire frame 38 is caused to move through cycles of upward and downward reciprocatory movement.

Secured to the frame 38, in the manner illustrated in Figure 4, are spaced fluid cylinders 48, which are preferably air-operated and of a relatively quick-acting type. These cylinders are positioned in spaced apart relation but inwardly of the toggle assemblies 44—46, substantially as shown in Figures 3 to 5. And in accordance with the teachings of the invention the operating rods 49 of the cylinders 48 extend in a forwardly direction and make connection with suitable rocker arms 50 which are rigidly secured to the shaft 47. Thus, upon energization of the cylinders 48 in one direction or the other the shaft 47 may be caused to rotate through a limited arc to change the relative position of the toggle links 44 and 45.

It will be noted, in regard to the toggle links 44 and 45, that the same have an effective length equal to the distance between the centers of eccentrics 25' and shaft 47. Thus, when the links 44 and 45 are aligned the effective length of the assembly is longest, and the frame 38 is supported in its lowest relation with respect to the eccentrics 25'. This arrangement is illustrated in Figures 8 and 11, for example, of the drawings.

On the other hand, when the links 44 and 45 are in substantial misalignment, as indicated in Figure 4, the effective length of the toggle assemblies is substantially reduced, and for this reason the frame 38 is carried in relatively high relation to the eccentrics 25' and to the carrier 26.

Thus, in the assembled shear apparatus I have mounted on the upper portion of the frame 38 a shear blade 51 which is positioned so as to be in cooperative shearing relation with the lower shear blade 29 only during reciprocatory movement of the frame 38 while supported in lower relation to the carrier 26; that is, only when the toggle mechanism 44—46 is aligned, to have its maximum effective length. Whenever the toggle mechanism is broken, by forward extension of the fluid cylinder 48, as shown in Figure 4, the frame 38 rides sufficiently high during its reciprocatory cycle of movement that the blades 51 and 29 do not make engagement and the material passing through the shearing apparatus is not severed. It will thus be apparent that while the supporting shaft 25 may be continuously rotated to effect a continuous upward and downward reciprocation of the frame 38, actual shearing operations may be selectively caused or prevented, as desired, by merely energizing the cylinder 48 to bring the toggle mechanism 44—46 into substantial alignment or to break such alignment, as may be the case. This simple and highly practical arrangement for effecting cutting or mis-cutting is an important feature of the invention in that, aside from its inherent simplicity, the operation of the shear is rendered more responsive to delicate control stimuli derived from a position remote from the shear. Heretofore complicated clutch and/or gear mechanisms have been employed to effect cutting and miss-cutting of the shearing apparatus. And it will be readily apparent that such clutch mechanisms are subject to large shock forces which result necessarily in higher construction and maintenance costs.

In Figures 7–12 I have illustrated, in simplified manner, my novel shearing apparatus during several sequential stages of a complete shearing operation, the toggle mechanism being in aligned relation so that shearing engagement is had between the shear blades 29 and 51. Thus, in Figure 7 the crank 36 and connecting rod 35 are carrying the frame 38 and carrier 26 through a rearward rocking movement whereby the shear blades 29 and 51 are carried along with the moving strip material. At the same time the shaft 25 and cams 25' are rotated counterclockwise so as to cause the frame 38 and shear blade 51 to move downwardly with respect to the carrier 26 and shear blade 29. The crank 36 and cams 25' are so oriented that the shear blade 51 is in its lowest position when the carrier 26 is in an approximately vertical position as illustrated in Figure 8. Continued rotation of the crank 36 carries the frame 38 rearwardly beyond a vertical position, as in Figure 9, and during this time the cams 25' rotate further in a counterclockwise direction to raise the upper blade 51 out of shearing relation to permit the continued travel of the material.

During the return rocking movement of the frame 38 and carrier 26 the cams 25' are in a raised position, as indicated in Figures 10–12 so that the continuously moving material may pass freely through the shearing apparatus at this time.

As is clearly evident in Figures 7–12 the oscillatory or rocking motion of the blades 51 and 29, in the plane of movement of the strip material will have an approximate harmonic or sine-wave relation to the velocity of the crank pin 36. Thus, if the crank shaft 37 were to have a uniform rotary movement, as has been common practice in the past, the velocity of movement of the blades 29 and 51 in the plane of strip travel would constantly vary, approximately in accordance with the equation $V=(\omega r)$ sine $\theta$, where $\omega$ represents crank rotation in radians per unit of time, $r$ represents the eccentricity of the crank pin 36, and $\theta$ represents the acute angle between the crank 36 and the connecting rod 35. And it may be readily understood that under such conditions the blades 29 and 51 would never attain a uniform speed, and would only approximate such uniform speed during a very small interval of time wherein the angle $\theta$ is very close to 90°. Thus, in prior apparatus of this same general nature it has been necessary to effect a complete shearing operation and a retraction of the shearing blades during this small interval of time, causing high shock loads on the shearing apparatus. And even then there was only an approximate synchronization of the cutting blades with the stock to be severed.

In accordance with the teachings of the present invention I provide a novel mechanism for driving the crank shaft 37 whereby substantial non-uniformity of rotation is obtained and whereby such non-uniformity operates to substantially compensate for the harmonic variations in the shear blade velocity over a substantial portion of the shear cycle. Thus, in the illustrated embodiment of the invention, I provide a drive mechanism 52, to be hereafter described more fully, having a drive shaft 53 extending toward the shear apparatus in angularly disposed relation, the arrangement being such that the axes of the crank shaft 37 and drive shaft 53 intersect in angular relation. Then, to connect the shafts 37 and 53 in driving relation I provide a large high power universal joint 54, which, in accordance with the preferred teachings of the invention, is a Hooke type universal joint, as distinguished from a constant velocity type joint. The Hooke type universal joint is a common coupling used to connect two shafts, the axes of which are not in line with each other but which merely intersect at a point. The joint comprises two forked members mounted at the ends of the intersecting shafts and drivingly connected with each other by means of interconnected right angularly related driving pins. A conventional form of the Hooke joint is illustrated at page 622, Machinery's Handbook, 13th edition, The Industrial Press, 1946.

As is well known, in a driving connection comprised of a Hooke type universal joint there is non-uniformity of motion between the driving element and the driven element, in this instance members 53 and 37 respectively, although, of course, both the driving and driven elements have equal cyclic periods. At any instant the ratio of the speed of the driven element to the speed of the driving element may be determined by the following equation:

$$\frac{\omega_1}{\omega_2} = \frac{\cos(a)}{1 - \sin^2(a)\cos^2(b)}$$

where $\omega_1$ represents the rotational speed of the driven member, $\omega_2$ represents the rotational speed of the driving member, $(a)$ represents the acute angle made by the intersection of the axes of the driving and driven members, and $(b)$ represents the angular displacement of the driving yoke of the universal joint from the plane defined by the above mentioned axes. Thus, it will be apparent that the driven member of the power train will rotate alternately at lower and higher speeds than the driving member during each complete revolution of the latter. And it will further be apparent that relative non-uniformity becomes more pronounced as the angle made by the axes of the driving and driven elements is increased.

In accordance with the above principles, I have determined that if the driving and driven elements 53 and 37 are caused to intersect at an angle of in the order of 37° and are joined by a Hooke type universal joint connection there will be produced in the driven member 37 a non-uniformity of motion which will substantially exactly compensate for the normal harmonic variations of the driving component or vector of the crank pin 36 over a substantial portion of a rotational cycle.

Thus, in the graph of Figure 13 the curve designated by the letter A represents a normal harmonic or sine curve which indicates the driving velocity component, or vector, of the crank pin 36, in terms of a percentage of the true velocity of the pin, over 180° of rotation of the crank 37. The curve designated by the letter B represents the ratio $\omega_1/\omega_2$, as discussed above, for an angle of intersection of 37°. The product of the ordinates of curves A and B gives a very close approximation of the actual velocity of the shear blades 29 and 51, in terms of a percentage of the true crank pin velocity, and in Figure 13 this product is represented by the curve C.

As is readily apparent upon inspection of curve C from 60 to 120 degrees of crank rotation the curve is almost exactly horizontal, indicating an almost exactly uniform velocity of the shear blades 29 and 51 during this period. Mathematical computations, in fact, show that the variation in blade velocity during this period is less than one percent. Whereas, following the sine curve A there is a variation of in excess of thirteen percent over this same period, while there is a variation of in excess of one percent over the period from 80 to 100 degrees of crank rotation.

In accordance with the teachings of my invention, therefore, there is a substantial time period wherein the shearing operation may be completed. I make good advantage of this fact by providing for a substantial rake or bias in the blades 29 and 51 (see Figure 5) so that the actual shearing operation progresses evenly from one side to the other of the material being sheared. The arrangement is such that stock of substantial thickness, traveling at a high line speed, may be adequately handled by shearing apparatus of moderate size, and the shearing equipment as a whole may be of lighter and more economical construction than equivalent apparatus constructed in accordance with teachings heretofore advanced.

It should be understood, however, that the present invention is not limited to mechanisms wherein the driving and driven elements 53 and 37 intersect at an angle "in the order of 37°." Rather, the teachings are applicable regardless of the magnitude of the angle, the specified range being merely best suited for the illustrated application. An angular range of from thirty to forty degrees is clearly contemplated in the present illustration.

It is of course contemplated, in the present invention, that the shear blades 29 and 51 and frame 38 will be operated on the same cyclic periods notwithstanding instantaneous velocity variations and the like. That is, during each rearward stroke of the rocking frame 38 and carrier 26, the frame 38 and upper shear blade will move downwardly in shearing or miss-cut relation, depending upon the orientation of the toggle linkage 44—46. Accordingly, I have provided a driving shaft 55, forming a part of the drive mechanism 52, which is geared for synchronous rotation with the shaft 53, and which is connected in driving relation with the carrier supporting shaft 25, the gearing being so synchronized that the frame 38 moves downwardly during rearward rocking movements thereof.

It will be readily understood, however, that in employing raked or biased shearing knives a substantial movement of the frame is required to effect a complete shearing operation, as compared to apparatus wherein parallel shear knives are employed. In view of this, I have found it desirable to speed up the operation of the shearing knives during the actual shearing operation so that the necessary substantial movement of the knives may be effected, and the knives sufficiently separated, during the 50 to 60 degrees of rotation of the crank 37 wherein substantially exact synchronization is had between the knives and the moving stock.

To hasten the shearing action of the knives 29 and 51, as above outlined, I have provided considerable offset between the shafts 55 and 25, as shown in Figure 3, these shafts being oriented in parallel relation in the illustration. Connecting the offset shafts 25 and 55 is an intermediate shaft, represented diagrammatically in Figure 3 by the numeral 56, there being a pair of universal joints 57 and 58 providing angular driving connection between the shafts 25 and 55 and the intermediate shaft 56. And in the preferred form of the invention the angle of intersection between the axis of the intermediate shaft 56 and the respective axes of shafts 25 and 55 is in the order of 35°.

In accordance with the teachings of the invention the universal joints 57 and 58 are Hooke type joints. And as heretofore discussed, when such joints are angularly related a non-uniform driving relation is obtained between the driving and driven members. Thus, it will be apparent that a non-uniform driving relation is had, in the first instance, between the drive shaft 55 and the intermediate shaft 56, and in the second instance between the intermediate shaft 56 and the carrier supporting shaft 25. Of course, the joints 57 and 58 may be arranged so that the non-uniformity of driving relation in each case additively or subtractively affects the other. That is, the joint 57 may be arranged to amplify the non-uniformity produced in the joint 58, or to compensate therefor, as may be desired. In the present instance, however, it is desired to obtain a high acceleration of the shearing blades during the period of synchronous movement of the frame 38, so that the joint 57 is arranged to amplify the non-uniformity produced by the joint. This is effected by positioning the yokes carried by the shafts 55 and 25 substantially at right angles, as illustrated in Figure 3. Thus, following the equation heretofore set forth relative to the instantaneous rotational speed of the driving and driven elements of a Hooke type universal joint, it may be shown that the shaft 25 will obtain a maximum rotational speed of close to 150 percent of the rotational speed of the principal driving shaft 55, which rotates at a constant speed. And by properly synchronizing the drive shafts 53 and 55 I may easily provide that this rapid rotational movement of the shaft 25 takes place during the period of synchronous movement between the carrier 26 and moving material, as will be readily appreciated.

For driving the shafts 25 and 37 and the feed rolls 14 and 15 in the desired relation I have provided a novel transmission mechanism, represented generally by the numeral 52, which is powered by a suitable variable speed electric motor 59, and which is operative to maintain the shafts 25 and 37 in exact synchronism and in predetermined speed relation to the feed rolls 14 and 15.

Referring now to Figure 6 of the drawings, the transmission 52 is provided with a casing or housing 60 from one end of which projects a shaft 61 adapted for connection to the electric motor 59. The shaft 61 carries a worm 62 on its central portion, which drives a mating worm 63 at reduced speed to rotate a shaft 64 journaled in the housing 60 in transversely disposed relation to the power input shaft 61. At one end the shaft 64 carries a pinion gear 65 which meshes with and drives a similar gear 66 journaled in the housing 60 below the gear 65. Keyed or otherwise secured to the gear 66 is the drive shaft 55 which extends outwardly of the housing 60 for connection with the carrier supporting shaft 25 in a manner heretofore described. The arrangement is such, as will be apparent, that a positive direct gear drive is afforded between the motor 59 and the carrier supporting shaft 25, which is in accordance with the preferred practice in flying shear construction.

Also keyed or otherwise secured to the shaft 55 is a bevel gear 67 which meshes with a similar bevel gear 68 carried by the drive shaft 53. The shaft 53 is disposed in angular relation to the housing 60, as will be observed, so that there may be an angular driving connection between the shaft 53 and crank 37 as has been discussed previously. And in the illustrated apparatus the bevel gears 67 and 68 are of a one-to-one ratio so as to have equal cyclic periods.

Shaft 53, and hence the crank 37, will also have a direct driving connection with the motor 59 as will be readily observed.

At the forward end of the shaft 61, which is connected directly to the motor 59, there is provided a pinion gear 69 which meshes with and drives a gear 70, forming a part of a differential drive mechanism designated generally by the numeral 71. A bevel gear 72 forms an integral part of, or is rigidly secured to the pinion 70 so as to rotate therewith at all times.

Positioned opposite the bevel gear 72, in spaced relation thereto but in axial alignment is a second bevel gear 73 which is a substantial duplicate of the bevel gear 72. And the bevel gear 73 is likewise rigidly secured to or forms an integral part of a pinion gear 74.

Between the bevel gears 72 and 73, and meshing with the same, are a plurality of small bevel gears 75 which are journaled and supported by a common spider-like member 76 positioned in axial alignment with the larger bevel gears 72 and 73. This structure represents a conventional differential drive mechanism. And, as will be understood, the arrangement is such that the spider-like differential element 76 rotates at a speed equalling one half the sum of the rotational speeds of the bevel gears 72 and 73. The first mentioned bevel gear 72, of course, is at all times driven at a speed proportionate to the speed of the motor 59. But, by regulation of the speed of rotation of the pinion 74 and bevel 73 it is possible to vary the speed of rotation of the differential element 76 independently of the motor 59. This is described more fully below.

Keyed to the spider-like differential element 76 is a shaft 77 which is journaled in the housing 60 and which carries a bevel gear 78 intermediate its ends. The bevel gear 78 drives a second bevel gear 79 carried by a drive shaft 80 extending from the housing 60. The shaft 80 carries a pinion 81 intermediate its ends which drives a second similar pinion, not shown, carried by a second shaft 82 located directly below the shaft 80 and disposed in parallel relation therewith. The shafts 80 and 82 are connected through couplings 19 and 20 with the feed rolls 14 and 15. Thus, it will be observed that while the frame and carrier assembly and shear blades are driven by direct drive from the motor 59, the feed rolls 14 and 15 are driven from the motor 59 through the variable differential mechanism 71, permitting variation in the cyclic period of the shear apparatus in relation to the line speed of the material fed, in accordance with usual flying shear construction.

In order to vary the speed of rotation of the bevel gear 73 of the differential mechanism, and thereby to regulate the rotation of the feed rolls in relation to the shear apparatus, I have provided a pinion 83 which meshes with the pinion 74 and which may be driven in variable speed relation to the motor 59. As illustrated in Figure 6, the pinion 83 is carried by a shaft 84 journaled in the housing 60 and driven by means of mating bevel gears 85 and 86. To drive the pinion 86 I provide a conventional variable speed positive drive device 87, which may be a commercial device known in the trade as a "P. I. V.," the initials P. I. V. representing the words "positive-infinitely-variable." In accordance with the teachings of the invention the pinion 86 is connected to the output shaft 88 of the P. I. V. device 87.

Secured to the input shaft 89 of the P. I. V. device 87 is a small bevel gear 90 having driving engagement with a large diameter pinion 91 carried at the end of shaft 77. The same shaft which drives the feed rolls 14 and 15, therefore, drives the input shaft of the P. I. V. unit 87, and this is an important aspect of the present invention as will presently appear.

It is contemplated by the present invention that the P. I. V. unit 87 will be a standard commercial product, having a variable input-to-output ratio of from in the order of ten-to-five to ten-to-twenty-five, or a total variation of about five-to-one. And, of course, the unit 87 is provided with means 87' (see Figure 14) for adjusting the input-to-output ratio as desired.

By following the gear train beginning with the bevel gear 72 and including the shaft 77, P. I. V. 87 and pinions 83 and 74, it will be observed that the rotation of the gear 74 will be opposite in rotation to that of the gear 70. That is, observing from the end of the housing from which the power input shaft 61 projects, the bevel gear 72 is rotating in a clockwise direction, while the bevel gear 73 is in a counterclockwise direction. And the gear ratios have been selected so that the bevel gear 73 at all times rotates at a slower speed than does bevel gear 72. Thus, upon the application of power to the bevel gear 72 the shaft 77 will be caused to rotate slowly in a clockwise direction at a speed equal to one half the difference between the speeds of rotation of the bevel gears 72 and 73. And by adjusting the P. I. V. unit 87 to vary the speed of rotation of bevel gear 73 in relation to the speed of rotation of the shaft 77 the speed of the latter may be varied in relation to the speed of the driving motor 59, as desired. For example, if the P. I. V. unit 87 is adjusted so as to have an increased output speed in relation to its input speed, the bevel gear 73 will tend to rotate at an increased speed, causing a more pronounced subtractive effect upon the differential mechanism 72 and thereby slowing down the shaft 77 in relation to the input speed of the motor 59.

In the normal operation of the shearing and drive mechansm described herein it is generally desirable to maintain the rate of travel of the material at a constant speed at all times. Therefore, in order to adjust the shearing mechanism so as to sever shorter lengths, for example, it is necessary to increase the frequency at which the shear frame and knives operate. To accomplish this the motor 59 is speeded up as will be readily understood. However, as the speed of the motor 59 increases the feed rolls 14 and 15 also tend to rotate at a greater speed. So it is then necessary to adjust the P. I. V. mechanism to slow down the speed of the shaft 77 in relation to the speed of the motor 59. The desired end result being that the shaft 77 rotates at a constant speed at all times to maintain a constant prevailing line speed.

In reference, again, to Figure 6 it will be noted that the input shaft 89 of the P. I. V. unit is driven directly from the shaft 77, so that in the normal operation of the shear equipment the P. I. V. input is maintained constant notwithstanding side variations in the cyclic period of the shear knives. This is an advantageous feature of the present invention in that standard P. I. V. drive units of the type herein contemplated operate most efficiently at a predetermined constant input speed. And the apparatus may be readily designed to maintain an optimum input speed for the P. I. V. unit employed.

As a general rule, adjustment of the speed of the drive motor 59 to effect an increase or decrease in the number of shearing cycles per unit of time is always accompanied by an appropriate adjustment of the P. I. V. unit 87 to the end of maintaining the rotation of the feed rolls 14 and 15 constant. Accordingly, it may be desirable to mechanically interconnect the motor and P. I. V. adjustments so that a single manipulative operation will produce the desired overall adjustment. Such an arrangement is illustrated in Figure 14, wherein the adjusting wheel 87' for the P. I. V. unit 87 is mechanically interconnected with a regulating rheostat, or variable resistor, 90, which forms a part of the power circuit for the motor 59. The mechanical interconnection, which is schematically represented at 91', may include suitable gear reduction means, not shown, so that when the wheel 87' is adjusted the motor speed is altered as necessary to maintain the line speed of the material constant. It will be understood, of course, that it is generally not necessary to maintain the line speed of the material exactly uniform at all times so that slight non-linearity in the motor and P. I. V. adjustments is of no particular consequence.

Whenever the cyclic period of the shear apparatus is increased or decreased to effect longer or shorter cuts the speed of movement of the shear blades will be changed accordingly, since the same is a function of the speed of rotation of the crank 37. Thus, for example, where the cyclic period of the shear is decreased, to produce shorter cuts, it is necessary to reduce the amplitude of the rocking movement of the shear frame 38 so that the actual velocity of the blades remains synchronized with the material. In accordance with the teachings of the present invention this is accomplished by rotating the threaded shaft 30 to raise the point at which the connecting link 35 engages the carrier 26. The crank pin 36, of course, has a fixed amplitude of movement so that as the link 35 is raised or moved away from the pivotal axis of the carrier 26 the same will have a movement of lesser amplitude, causing the blades 29 and 51 to move at a reduced speed in the direction of strip movement. Thus, it will be clear that for each setting of the P. I. V. 87 there is a corresponding setting for the connecting link 35 at which the velocity of the shear knives moves in synchronism with the strip material during shearing operations.

In the illustrated embodiment of the invention the shaft 30 is rotated by motor 32, controlled from a remote station, not shown. And it is contemplated that suitable selsyn or limit switch controls may be employed to automatically correlate the operation of motor 32 with adjustments effected at the P. I. V. unit 87.

In its preferred form, the apparatus of my invention is adapted for a two-to-one adjustment of the shear cycle in relation to the line speed of the material, so that the maximum length of material which may be sheared in a single shear cycle is at least twice the length of the minimum section which may be sheared. Where longer sections of material are desired I provide means including the toggle mechanism 44—46 for rendering the shear apparatus ineffective during certain of its cycles. For example, in order to cut sections equalling three times the length of the minimum section the shear apparatus is adjusted to have a shearing cycle which would produce a cut section equal to one and one-half times the minimum section. But the shearing apparatus is arranged to be ineffective, or to miss-cut, during alternate cycles, so that the actual cut sections are equal to three times the minimum section. And it is understood, of course, that any number of miss-cut cycles may be provided so that it is possible to obtain an actual cut section which is many times the length of the minimum section, the apparatus being infinitely adjustable over its entire range as will be readily apparent.

To produce miss-cut cycles in the manner desired I prefer to employ a simple counter circuit which is operative to count a predetermined number of miss-cut cycles, and thereupon to condition the shearing apparatus for an actual shearing operation. Thus, in Figure 15 there is shown a switch 91 which is positioned adjacent one of the eccentrics 25' of the supporting shaft 25 and which is arranged to be actuated once during every revolution of the shaft 25. The switch 91 is connected through conductors 92 and 93 to counter panel 94, which may be of conventional design, for registering the number of times the switch 91 closes, or the number of cycles of operation of the shearing apparatus. In accordance with the teachings of the invention the counter 94 is provided with an adjustment 95 which may be set for any predetermined number of cycles. And upon such predetermined number of cycles being reached a circuit is completed by the counter 94 to a solenoid operated valve 96, energizing the same, and directing fluid under pressure to the forward or rod end of the cylinder 48. At this time the toggle mechanism 44—46 is straightened, and during the next succeeding downward stroke of the frame 38 blades 29 and 51 move into shearing relation, severing the desired length of material. The counter 94, of course, resets at this time and again counts a predetermined number of miss-cut cycles before energizing valve 96. While valve 96 is in a deenergized condition fluid is directed to the head end of cylinder 48 to maintain the toggle 44—46 in broken or miss-cut condition.

The counter line 4 is preferably in the form of a common electronic digital counter or computer which is adapted to receive and record periodical electric impulses transmitted thereto upon closure of switch 91, and to energize an actuating circuit for the valve 96 upon the registration of a predetermined adjustable number of such impulses. In general such counters comprise a plurality of electrically interconnected electronic valves which are caused to conduct in predetermined sequential relation in response to the reception of periodical signal pulses, and when the preset number of pulses is indicated by the conduction of a predetermined combination of electronic valves an output control circuit is energized and all of the electronic valves are extinguished, preparing or resetting the counter for a new control series.

As shown in Figure 15, the counting switch 91 is positioned so as to be actuated during upward movement of the shear frame 38 so that substantial time is provided for the toggle mechanism 44—46 to straighten prior to the following downward stroke, wherein an actual shearing operation is effected. When it is desired to effect a cut during every shear cycle the valve 96 remains energized at all times, maintaining the toggle 44—46 in an aligned condition.

It is of course understood that the switch 91 illustrated herein is only one of many well known devices or arrangements which may be employed for detecting the cycles of operation of the shear apparatus.

It should now be apparent that I have carried out the objects initially set forth. The apparatus of my invention incorporates a number of novel and advantageous features which jointly and separately provide for substantial improvement in the flying shear system.

One of the most important features of my invention resides in the combination with a crank operated shear device of a drive mechanism including a universal joint set at a fixed angularity and arranged with respect to the driving crank for the shear so that harmonic variations in the movement of the crank are substantially eliminated over a large portion of the shearing cycle. The arrangement is such that a substantial period of time is afforded in which the actual shearing operation may be completed so that the shear blades may have considerable rake or bias and the shearing force may be applied slowly and evenly. My improvement in this regard permits a reduction of large magnitude in the actual shearing force required and in shock forces which are more or less inherent in apparatus of this nature. In turn, the shear frame and allied apparatus may be of relatively lightweight construction, simplifying and lightening the mechanism required to carry the shear apparatus through its required oscillatory movements.

It should be noted, however, with reference to this aspect of my invention, that a universal joint set at a fixed angularity is not the sole mechanism which may be successfully employed to obtain such substantial uniformity of shear blade motion. Thus, such mechanism as elliptical gear trains may be utilized, to the end that the non-uniformity of transmission caused by the mechanism used substantially compensates for the harmonic variations in shear motion produced by the crank or eccentric drive.

Another novel feature of my invention is the simplified and inherently rugged arrangement for adjusting the point at which the driving links 35 connect the shear frame carrier 26. Thus, I have employed threaded shafts which extend generally radially from the point of support for the carrier 26 so that upon rotation of the shafts the connecting links 35 are moved toward or away from the point of support. And when the driving crank 36 is speeded up, for example, it is merely necessary to raise the driving links 35 a proportionate amount so that the shear knives remain in synchronism with the moving strip material. In addition, it will be observed that as the cyclic period of the shear apparatus is reduced, requiring greater acceleration of the shear components, the point of connection between the carrier 26 and links 35 is raised so that increased driving leverage is obtained.

In combination with means to render the movement of the shear knives synchronous with the moving strip material over a substantial distance I have further provided a drive mechanism for effecting shearing movement of the knives which includes transmission means for producing a non-uniform shearing motion, to the end that the shearing operation is carried out with substantial rapidity even though the knives have a greater amplitude of movement than has been common heretofore. In the present illustration I have employed a pair of universal joints, set at a constant angularity, which produce an additive non-uniform transmission effect during downward movement of the shear frame 38 whereby the same is accelerated to a higher velocity during that portion of the shear cycle during which shearing actually takes place. Here again, however, the invention is not restricted to the use of universal joints for this purpose, but contemplates the use of any equivalent mechanisms such as eliptical gears, for example. I prefer universal joints over these other mechanisms, however, as the same are generally more simple and efficient, and, if properly constructed, are more rugged and therefore more suitable for the purpose intended.

It will be noted, further, that while the shear frame 38 is accelerated in its vertical or shearing movements, the frame 38 and carrier 26 are decelerated in rocking movement. The arrangement is such that the increased power provided for acceleration in one case is partially provided by the release of energy from deceleration in the other case. And, optionally, a suitable fly-wheel 97 (see Figure 3) may be provided to reduce load variations on the drive motor 59.

Another advantageous feature of my invention is my novel transmission assembly, including a P. I. V. unit, wherein the P. I. V. unit and a differential drive assembly are utilized to drive uniformly rotating feed rolls, while a direct drive connection is afforded between the constantly accelerating and decelerating shear assembly and the main drive motor 59. Of course this type of drive assembly is not broadly new, but the apparatus of the present invention has the outstanding advantage of having a constant speed input for the P. I. V. unit, which has not heretofore been accomplished where the P. I. V. unit has been employed in the feed roll drive with a direct drive for the shear apparatus. In accordance with the teachings of my invention the P. I. V. input has direct connection with the feed rolls 14 and 15, which are preferably driven at a substantially constant speed. And the drive ratios are so chosen as to cause the P. I. V. unit to have a high efficiency output under all conditions of operation.

My transmission assembly is further advantageous with respect to its general compactness and unitary construction. All drive shafts extend from a single compact housing, with simple external coupling connections for the drive motor and P. I. V. unit which are preferably of standard commercial design and construction.

A further advantageous feature of my invention resides in the simplified toggle mechanism 44—46 for effecting cuts or miss-cuts as desired. Heretofore it has been common to employ clutch mechanisms and the like which are necessarily subject to severe shock forces and therefore subject to high construction and maintenance costs. My invention, on the other hand, contemplates a continuously oscillating shear frame member, the center of oscillation of which may be changed by breaking or aligning a simple toggle mechanism which connects the shear frame with the drive eccentrics therefor. It will be noted, also, that I may readily employ, with my improved miss-cut mechanism, a simplified control arrangement comprising a counter device and a fluid valve responsive thereto, whereby a predetermined number of miss-cuts may be effected between each cut. By this arrangement the useful range of my apparatus may be extended to all practical limits, while the mechanical adjustment means employed afford adjustment over merely a two-to-one range, from a minimum length to at least twice such minimum length.

It should be understood, however, that the apparatus herein illustrated and described in detail is intended to be illustrative only and reference should therefore be had to the following appended claims in determining the full scope of the invention.

I claim:

1. In a flying shear of the type having a pivotally mounted rocking frame, shear knives on said frame, and means to rock said frame to move said knives in the direction of movement of material to be sheared; the improvement in said means to rock comprising an eccentric shaft positioned in spaced parallel relation to the pivotal support for said rocking frame, a driving link connecting said eccentric shaft and said rocking frame, and means to drive said eccentric shaft comprising a uniformly rotating power device having a drive shaft and a Hooke type universal joint interconnecting said shafts, said drive shaft having substantial angular relation with the principal axis of said eccentric shaft.

2. Apparatus according to claim 1 further characterized by said drive shaft having a fixed angular relation with said eccentric shaft of in the order of thirty to forty degrees.

3. In a flying shear of the type having a pivotally mounted frame, shear knives on said frame, and means to rock said frame to move said knives in the direction of movement of material to be sheared; the improvement in said means to rock comprising an eccentric shaft positioned in spaced parallel relation to the pivotal support for said rocking frame, a driving link connecting said eccentric shaft and said frame, uniformly rotating power means, and modifying transmission means connecting said power means and said eccentric shaft whereby the angular velocity of the latter is cyclically changed in relation to said uniformly rotating power means.

4. Apparatus according to claim 3 further characterized by said eccentric shaft having a substantially harmonic driving relation with said rocking frame, and said transmission means being operative to compensate for the harmonic variations of said eccentric shaft over a substantial portion of the rotational cycle thereof.

5. In a driving mechanism for an oscillatory device the combination of an eccentric having substantially harmonic driving relation with said device, uniformly rotating power means, and modifying transmission means connecting said power means and eccentric whereby the angular velocity of said eccentric is cyclically changed in relation to said unformly rotating power means.

6. Apparatus according to claim 5 further characterized by said modifying transmission means comprising a Hooke type universal joint, and said uniformly rotating power means having angular driving relation with said eccentric.

7. In a flying shear system the combination of a rockable carrier member having a first shear blade, a shear frame carried by said carrier for rocking movement therewith and adapted for generally vertical oscillatory sliding movement with respect to said carrier, said shear frame having a second shear blade, a first eccentric device for rocking said carrier and shear frame, a second eccentric device for oscillating said shear frame with respect to said carrier, common uniformly rotating power means, a first modifying transmission means connecting said power means and first eccentric device for rotating the latter whereby the angular velocity of said first eccentric is cyclically changed in relation to said power means, second modifying transmission means connecting said power means and said second eccentric device for rotating said second eccentric device whereby the angular velocity of said second eccentric is cyclically changed in relation to said power means, said first and second modifying transmission means having out-of-phase relationship whereby the rotational speeds of said eccentric devices are alternately accelerated and decelerated in opposition.

8. Apparatus according to claim 7 further characterized by said first and second modifying transmission means including Hooke type universal joints, and said uniformly rotating power means having angular driving relation with said eccentric devices.

9. In flying shear apparatus of the type having a rocking frame carrying shear knives, and feed rolls for causing strip material to pass through said shear; means to rock said frame to carry said knives along with said strip comprising a crank, a driving link connecting said crank and said frame, said crank having a substantially harmonic driving relation with said frame, a drive shaft for said crank, means to drive said shaft, a Hooke type universal joint having driving connection between said drive shaft and said crank, said drive shaft having substantial angular driving relation with said crank and being related thereto in such manner as to decelerate the rotational speed of said crank to a minimum substantially at the time said crank imparts a maximum component of driving velocity to said frame, the arrangement being such that the non-uniformity of rotation of said crank is substantially compensating for the harmonic variations in driving movement imparted by said crank over a substantial portion of the rotational cycle thereof, and means to vary the distance from the pivotal axis of said frame at which said driving link connects the latter.

10. Apparatus according to claim 9 further characterized by said drive shaft having an angular driving relation of approximately thirty-seven degrees with said crank whereby said frame has a substantially uniform speed of movement during approximately sixty degrees of rotation of said crank.

11. In driving mechanism for a shearing device the combination of an eccentric having driving relation with said shearing device, a drive shaft, means to rotate said drive shaft, modifying transmission means connecting said drive shaft and said eccentric whereby the angular velocity of said eccentric is cyclically changed in relation to the angular velocity of said drive shaft, said modifying transmission means operative to decelerate the rotational speed of said eccentric to a minimum substantially at the time said eccentric imparts a maximum component of driving velocity to said shearing device, and the arrangement being such that the non-uniformity of rotation of said eccentric is substantially compensating for the harmonic variations in driving movement imparted by said eccentric over a substantial portion of the rotational cycle thereof.

12. Apparatus according to claim 11 further characterized by said modifying transmission means comprising a Hooke type universal joint, and said drive shaft having substantial angular driving relation with said eccentric.

13. Apparatus according to claim 12 further characterized by said angular driving relation being approximately thirty-seven degrees.

References Cited in the file of this patent

UNITED STATES PATENTS

| | | |
|---|---|---|
| 704,941 | Slick | July 15, 1902 |
| 1,958,538 | Hallden | May 15, 1934 |
| 1,969,433 | Smitmans | Aug. 7, 1934 |
| 1,973,515 | Talbot | Sept. 11, 1934 |
| 1,996,617 | Hahn | Apr. 2, 1935 |
| 2,180,202 | Hallden | Nov. 14, 1939 |
| 2,251,312 | Yoder | Aug. 5, 1941 |
| 2,261,007 | Talbot | Oct. 28, 1941 |
| 2,305,128 | Andresen et al. | Dec. 15, 1942 |
| 2,415,325 | Wood | Feb. 4, 1947 |
| 2,436,572 | Henschker | Feb. 24, 1948 |
| 2,476,466 | Thomas | July 19, 1949 |
| 2,494,413 | Slettengren | Jan. 10, 1950 |
| 2,495,988 | Sheppard | Jan. 31, 1950 |
| 2,632,509 | Skillman | Mar. 24, 1953 |
| 2,642,937 | Hallden | June 23, 1953 |
| 2,653,662 | Biggert | Sept. 29, 1953 |